United States Patent
Ogasawara et al.

[19]

[11] Patent Number: 6,126,914

[45] Date of Patent: Oct. 3, 2000

[54] HYDROGENATION CATALYST FOR PRODUCTION OF HYDROGEN PEROXIDE, AND METHOD FOR PREPARATION OF SAME

[75] Inventors: Kazuharu Ogasawara; Tomio Kato; Norikazu Okuda, all of Tokyo; Tetsuya Konishi, Ibaraki-ken; Kenji Kato, Tokyo, all of Japan

[73] Assignee: Mitsubishi Gas Chemical Co., Inc., Tokyo, Japan

[21] Appl. No.: 09/314,537

[22] Filed: May 19, 1999

Related U.S. Application Data

[62] Division of application No. 09/140,436, Aug. 26, 1998, abandoned, which is a division of application No. 08/820,085, Mar. 19, 1997, Pat. No. 5,853,693.

[30] Foreign Application Priority Data

| Apr. 3, 1996 | [JP] | Japan | 8-81365 |
| Apr. 3, 1996 | [JP] | Japan | 8-81366 |
| Apr. 3, 1996 | [JP] | Japan | 8-81367 |
| Apr. 3, 1996 | [JP] | Japan | 8-81368 |

[51] Int. Cl.[7] .................................. C01B 15/023
[52] U.S. Cl. ............................................. 423/588
[58] Field of Search ...................... 502/262, 335; 423/588

[56] References Cited

U.S. PATENT DOCUMENTS

| 2,657,980 | 11/1953 | Sprauer. |
| 2,837,411 | 6/1958 | Jenney. |
| 2,867,507 | 1/1959 | Gleason et al. . |
| 2,940,833 | 6/1960 | Le Feuvre et al. . |
| 3,668,148 | 6/1972 | Van Beek et al. . |
| 3,694,376 | 9/1972 | Kabisch et al. . |
| 3,700,745 | 10/1972 | Kouach et al. . |
| 3,853,786 | 12/1974 | Forni et al. . |
| 4,192,777 | 3/1980 | McVicker et al. . |
| 4,258,025 | 3/1981 | Copelin . |
| 4,289,709 | 9/1981 | Kaiser . |
| 4,428,922 | 1/1984 | Hopkins . |
| 4,521,531 | 6/1985 | Coates . |
| 4,522,748 | 6/1985 | Maurer et al. . |
| 4,608,362 | 8/1986 | Darke . |
| 5,053,377 | 10/1991 | Lerot et al. . |
| 5,110,779 | 5/1992 | Hucul ..................................... 502/262 |
| 5,114,902 | 5/1992 | Schwarz et al. ....................... 502/262 |
| 5,122,496 | 6/1992 | Vorlop et al. .......................... 502/262 |
| 5,342,603 | 8/1994 | Deremince et al. . |
| 5,399,333 | 3/1995 | Kato et al. . |
| 5,772,977 | 6/1998 | Jenkins et al. . |
| 5,776,240 | 7/1998 | Deller et al. ........................... 423/335 |

FOREIGN PATENT DOCUMENTS

| 0 384 905 | 8/1990 | European Pat. Off. . |
| 3312252 | 10/1984 | Germany . |
| 49-5120 | 2/1974 | Japan . |
| 63-29588 | 6/1988 | Japan . |
| 718306 | 4/1953 | United Kingdom . |
| 776991 | 10/1955 | United Kingdom . |
| WO 96/18574 | 6/1996 | WIPO . |

OTHER PUBLICATIONS

Santacesaria et al.,, "Kinetics, Mass Transfer, and the Palladium Catalyst Deactivation in the Hydrogenation Step of the Hydrogen Peroxide Synthesis via Anthraquinone", *Ind. Eng. Chem. Res.*, 33, pp. 277–284 (1994).

Santacesaria et al., "Hydrogenation of 2–Ethyltetrahydroanthraquinone in the Presence of Palladium Catalyst", *Ind. Eng. Chem. Res.*, 27, pp. 780–784 (1988).

Fukuma et al., "Specific Gas–Liquid Interfacial Area and Liquid–Phase Mass Transfer Coefficient in a Slurry Bubble Column", *Jour. of Chem. Engineering of Japan*, 20, No. 3, pp. 321–324 (1987).

*Primary Examiner*—Wayne Langel
*Attorney, Agent, or Firm*—Frishauf, Holtz, Goodman, Langer & Chick, P.C.

[57] ABSTRACT

A hydrogenation catalyst for the production of hydrogen peroxide by the hydrogenation of anthraquinones in accordance with a hydrogen peroxide production process utilizing an anthraquinone method. The catalyst includes palladium supported on a carrier. The carrier comprises spherical silica particles, wherein at least 90 wt % of the silica particles have particle diameters of 10 to 100 $\mu$m. The silica particles have an average particle diameter of 30 to 60 $\mu$m and a pore volume of 0.4 to 1.0 ml/g. The catalyst has desirable activity, strength, service life and selectivity.

7 Claims, No Drawings

HYDROGENATION CATALYST FOR PRODUCTION OF HYDROGEN PEROXIDE, AND METHOD FOR PREPARATION OF SAME

This is a division of application Ser. No. 09/140,436, filed Aug. 26, 1998, abandoned, which is a division of application Ser. No. 08/820,085 filed Mar. 19, 1997, now U.S. Pat. No. 5,853,693.

BACKGROUND OF THE INVENTION (i) Field of the Invention

The present invention relates to a hydrogenation catalyst for the production of hydrogen peroxide, a method for the production of the same, and a method for the production of hydrogen peroxide by the use of the hydrogenation catalyst. More specifically, the present invention relates to a catalyst which can be used in the hydrogenation reaction of anthraquinones in a hydrogen peroxide production process utilizing an anthraquinone method and which is excellent in activity, strength, life, selectivity and the like; a method for efficiently preparing this catalyst; and an industrially advantageous method for economically preparing hydrogen peroxide by the use of this catalyst.

(i) Description of the Prior Art

A main production process of hydrogen peroxide which has currently been practiced on an industrial scale is called an anthraquinone method in which anthraquinones are used as reaction media. In general, the anthraquinones are used by dissolving them in an appropriate organic solvent. This organic solvent may be a single organic solvent or a mixed organic solvent, but it is usually a mixture of two organic solvents. The solution obtained by dissolving the anthraquinones in the organic solvent is called "a working solution".

According to the anthraquinone method, the anthraquinones in the working solution are subjected to reduction (hereinafter referred to as "the hydrogenation") with hydrogen in the presence of a catalyst in a reduction step to produce corresponding anthrahydroquinones. Next, in an oxidation step, the anthrahydroquinones are oxidized with air or an oxygen-containing gas to convert the anthrahydroquinones into the anthraquinones again and to simultaneously produce hydrogen peroxide. Hydrogen peroxide produced in the working solution is usually extracted with water in an extraction step to be separated from the working solution. The working solution from which hydrogen peroxide has been separated is returned again to the reduction step, thereby forming a cyclic process. This cyclic process can produce hydrogen peroxide substantially from hydrogen and air, and hence it is an extremely efficient process. This cyclic process has already been used for the industrial production of hydrogen peroxide.

In this cyclic process, the reaction for the reduction of the anthraquinones is a very important step, and it is a large theme that this step is improved so as to be an excellent step from the viewpoints of operation and economy. This reduction reaction of the anthraquinones can be carried out by blowing hydrogen into a reactor in which the working solution containing the anthraquinones and the catalyst-are present. The blown hydrogen is first dissolved in the working solution, and this working solution is then stirred to disperse hydrogen and to simultaneously move hydrogen onto the surface of the catalyst. On the surface of the catalyst, hydrogen is reacted with the anthraquinones to produce the anthrahydroquinones.

In general, the reduction reaction of the anthraquinones is a very rapid catalytic reaction, and so this reaction is largely affected by a mass transfer rate of hydrogen. Thus, it is known that a reaction rate is limited by the transfer of a hydrogen gas to the working solution and additionally the transfer rate of the hydrogen gas onto the surface of the catalyst [e.g., Ind. Eng. Chem. Res., Vol. 33, p. 277–284 (1994)]. In order to raise the reaction rate, important are the development of a catalyst having a higher activity and the creation of such a reactor design that the mass transfer rate of hydrogen can be raised.

Furthermore, one of the main operation costs of the above-mentioned cyclic process is a catalyst cost. The activity of the catalyst deteriorates with the lapse of use time, and therefore, in order to maintain the desired hydrogenation reaction rate of the anthraquinones, the addition or the replacement of the catalyst is required. Accordingly, for the purpose of reducing the operation costs, it is necessary to use the catalyst having a high activity and a low deterioration rate.

As the catalyst for use in the hydrogenation of the anthraquinones, there are known a Raney nickel catalyst, a palladium black catalyst and a palladium catalyst supported on a carrier. The Raney nickel catalyst is highly active, but it has many drawbacks. For example, the Raney nickel catalyst noticeably deteriorates owing to a trace amount of hydrogen peroxide in the working solution, and it is an ignitable metal and so its handling is dangerous. In addition, its selectivity is low. The palladium black catalyst mentioned above is excellent in the activity and the selectivity, but its separation from the working solution is difficult. For the industrial production of hydrogen peroxide which is liable to decompose in the presence of palladium, the palladium black catalyst has the fatal disadvantage. On the other hand, with regard to the palladium catalyst supported on the carrier, its activity and selectivity are slightly inferior to those of the palladium black catalyst, but the separation of the palladium catalyst from the working solution is possible, and the palladium catalyst can be considered to be a catalyst suitable for the industrial production of hydrogen peroxide.

As the palladium catalyst supported on the carrier, there have been suggested catalysts supported on various carriers such as silica, alumina, silica-alumina, aluminosilicates, carbonates of alkaline earth metals and activated carbon, but all of these catalysts do not meet conditions such as a low cost, a high catalyst strength, a high activity and a high selectivity required as the industrial catalyst. Actually, a limited part alone of the above-mentioned catalysts can industrially be utilized.

The palladium catalyst supported on the alumina is one of a few catalysts which are industrially utilizable, and it has advantages such as a relatively high activity and an easy regeneration by calcination, but it also has a disadvantage that by-products are produced in large quantities during the hydrogenation of the anthraquinones and another disadvantage that the activity noticeably deteriorates owing to water in the working solution (U.S. Pat. No. 2,867,507). As an example of methods for preparing the palladium catalyst supported on the alumina, British Patent No. 718,306 has described a method which comprises impregnating a γ-alumina carrier with a palladium salt, treating the carrier with a hydroxide of a metal or an aqueous carbonate solution, and then doing reduction with a hydrogen gas. Furthermore, Japanese Patent Publication No. 5120/1974 has suggested a method which comprises impregnating the alumina carrier with palladium, copper or silver, and another method which comprises further treating the alumina carrier at 150 to 650° C. in a gas containing hydrogen after the impregnation.

The thus obtained catalyst can improve the selectivity of the hydrogenation of the anthraquinones to some extent. However, these preparation methods have some drawbacks. For example, a complicated operation is required, and since the heat treatment is carried out by the use of hydrogen gas, the operation is dangerous and hence these methods are not suitable for the mass production of the catalyst. In addition, the activity of the prepared catalyst unavoidably deteriorates owing to water in the working solution.

Furthermore, the palladium catalyst supported on silica is also one of a few catalysts which are industrially utilizable. With regard to the palladium catalyst supported on silica, Japanese Patent Publication No. 29588/1988 has suggested a catalyst to which at least one metal selected from the group consisting of zirconium, thorium, cerium, titanium and aluminum is added. In this catalyst, the deterioration due to water in the working solution does not occur in contrast to the palladium catalyst supported on the alumina, and the activity and life which are satisfactory to some extent can be obtained. Nevertheless, the improved activity and life cannot be considered to be sufficient.

If the preparation method of the palladium catalyst supported on a carrier other than silica is applied as the preparation method of the palladium catalyst supported on silica, a fatal problem takes place. That is to say, in this case, it is not considered that the adsorbability of a palladium compound on the carrier depends upon the physical and chemical characteristics of the carrier, and therefore palladium is apt to peel off from the prepared palladium catalyst supported on silica, so that the deterioration of the catalytic activity and the decomposition of hydrogen peroxide produced in the oxidation step tend to occur.

In U.S. Pat. No. 2,657,980, as an example of the preparation method of the palladium catalyst supported on γ-alumina, there has been disclosed a preparation method which comprises supporting a palladium compound on γ-alumina, and then reducing it with hydrogen or formaldehyde, and as a comparative example, a palladium catalyst supported on silica has been prepared in a similar manner. In the U.S. patent, it has been described that the catalyst has a low activity, and this fact implies that when silica is used as the carrier, the adsorption of $PdCl_4^{2-}$ is insufficient, so that palladium is peeled off.

As preparation methods of the catalyst which can solve the problem of the palladium catalyst supported on silica, i.e., the peeling of palladium, there have been suggested some methods in which a treatment using a base is carried out prior to the supporting of the palladium compound on silica. In U.S. Pat. No. 2,940,833, sodium bicarbonate is used as the base, and in British Patent No. 776,991, an insoluble magnesium compound is used as the base.

However, it is not known that the palladium catalysts supported on silica prepared by these methods have been applied to the preparation of the hydrogenation catalyst for the industrial manufacture of hydrogen peroxide.

Furthermore, as a preparation method which can suppress the peeling of palladium, the above-mentioned Japanese Patent Publication No. 29588/1988 has suggested a method which comprises mixing a water-soluble palladium salt, silica and a water-soluble salt of at least one metal selected from the group consisting of zirconium, thorium, cerium, titanium and aluminum, and then regulating a the to support palladium and the metal in a state of a carbonate, an oxide or a carbonate on silica. In the publication, it has been described that in this method, the added metal compound functions as an deposition accelerator for accelerating the deposition of the palladium compound on the silica carrier.

However, this method has a drawback that a complicated operation is required. Particularly in order to surely carry out the support of palladium, the precise control of the regulation of the pH and the amount of the added metal is necessary.

As described above, the conventional preparation methods of the palladium catalyst supported on silica have been improved in the peeling of palladium to some extent, but they have some problems such as the poor strength of the prepared catalyst and the complicated operation. Accordingly, the conventional methods cannot be considered to be sufficient.

Furthermore, in the above-mentioned cyclic process for preparing hydrogen peroxide, the working solution is cyclically reused, and therefore alkyloxanthrones and alkyltetrahydroanthraquinones produced by the hydrogenation of the anthraquinones and other by-products which cannot produce hydrogen peroxide any more are slowly accumulated in the working solution, while the production of hydrogen peroxide is continued. The production of these by-products leads to not only the loss of fed hydrogen but also the loss of the expensive anthraquinones, which inconveniently increases the manufacturing cost of hydrogen peroxide. A part of these by-products can be returned to the original anthraquinones by a suitable treatment, but such a treatment results in the increase in the manufacturing cost of hydrogen peroxide. Therefore, the selectivity of the catalyst is an indispensable factor for the hydrogenation catalyst for the anthraquinones, and this factor is important on an equality with the strength, the activity and the life of the catalyst or is more important than them.

However, as described above, the conventional catalysts have been improved in its strength, activity and life to some extent, but its selectivity cannot be considered to be sufficient.

On the other hand, examples of a reactor which can be used in the present invention include a suspension bubble column comprising a tower container to which a gas and a liquid can be introduced in the presence of the catalyst, and a tank container equipped with a stirrer. The suspension bubble column has been used for many years because of a simple structure, and the absorption rate of the gas into the liquid depends largely on the area of an interface between the gas and the liquid [e.g., Fukuma et al., J. Chem. Eng. Japan, Vol. 20, p. 321 (1987)]. On the other hand, the mechanical stirring reactor can increase the mass transfer rate by mechanical stirring, and so this type of reactor has widely been used inclusive of an operation under pressure, except for a case where the amount of the gas is much larger as compared with that of the liquid. Also on the production of hydrogen peroxide, researches have been conducted, and there has been done the measurement of a hydrogen gas transfer rate in a case where the reduction reaction of the anthraquinones is carried out in the presence of the palladium catalyst in the mechanical stirring reactor [e.g., Ind. Eng. Chem. Res., Vol. 27, p. 780–784 (1988)].

However, when the mechanical stirring reactor or the suspension bubble column is used in the reduction step of the anthraquinone method, some problems occur. The catalyst for the reduction reaction collides against stirring blades and the wall of the reactor, so that the catalyst is pulverized to form a fine powder having a very small particle diameter. However, from the viewpoint of safety, a filter for preventing the fine powder from getting into a next oxidation step is required, and such a filter system is usually expensive. Furthermore, the fine powder formed by the above-mentioned pulverization causes the clogging of the filter on occasion. In addition, palladium tends to peel off from the carrier, so that a problem such as the deterioration of a catalytic activity comes up.

Usually, in the catalyst for the reduction of the anthraquinones, an expensive metal such as palladium is used, as described above, and therefore, when the above-mentioned problems occur, the system is economically disadvantageous.

When the rotational speed of the stirring blades is increased particularly in the mechanical stirring reactor in order to increase the reaction rate of the reduction, the above-mentioned problems are noticeable.

For the purpose of solving the problems regarding the reduction reaction of the anthraquinones, a fixed-bed type reactor can be employed as needed. In this case, it can be presumed that the pulverization and the wear of the above-mentioned catalyst for the reduction decrease, and the cost is lower than in the filter system. However, when the fixed-bed type reactor is employed for the reduction of the anthraquinones, the following problems are present. A hydrogen gas transfer rate, i.e., a dissolving rate of the hydrogen gas into the working solution, and additionally the transfer rate of the hydrogen gas onto the surface of the catalyst are low, and so a reduction rate cannot be increased; and pores in the catalyst cannot be utilized as effective reaction sites. Therefore, in the case that the fixed-bed type reactor is employed for the reduction of the anthraquinones, a technique for increasing the mass transfer rate is necessary. In U.S. Pat. No. 2,837,411, a device for previously bringing hydrogen to be introduced into the reactor into contact with the working solution is installed, and in U.S. Pat. No. 4,428,922, a technique has been suggested in which the working solution is mixed with hydrogen by a static mixer prior to introducing them into the reactor. In both the techniques, however, the amount of the working solution to be circulated swells and the consumption of hydrogen increases, and for these reasons, this fixed-bed type reactor is not always economically advantageous. In addition, U.S. Pat. No. 4,552,748 has suggested a reduction reaction device having a honeycomb structure, but in this case, the removal of reaction heat is tardy for a structural reason, so that a temperature in the vicinity of the center of the honeycomb rises and the allover uniformity of a reaction temperature is inconveniently lost. In addition, it is difficult to uniformly disperse the hydrogen gas in the working solution, so that the uniformity of the reduction reaction is also lost.

In EP Patent No. 0384905, the hydrogen gas and the working solution are introduced into the fixed-bed type reactor through its upper portion, and the introduction speed of the working solution is set so as to be lower than the speed of the working solution which downward flows through the fixed bed by its weight, whereby a higher reaction rate than in the conventional fixed-bed type reactor can be obtained. Also in this case, however, the production rate of hydrogen peroxide per weight of the catalyst is lower as compared with the mechanical stirring reactor and the suspension bubble column.

In this connection, as a technique regarding the hydrogenation catalyst for use in the hydrogen peroxide manufacturing process utilizing the anthraquinone method, WO 96/18574 is present in addition to the above-mentioned techniques, and as a production method of hydrogen peroxide, U.S. Pat. No. 5,399,333.

SUMMARY OF THE INVENTION

Under such circumstances, the present invention has been developed, and an object of the present invention is to provide a catalyst which can be used in the hydrogenation reaction of anthraquinones in a hydrogen peroxide production process utilizing an anthraquinone method and which is excellent in activity, strength, life, selectivity and the like.

Another object of the present invention is to provide a method for efficiently preparing this catalyst.

Still another object of the present invention is to provide an industrially advantageous method for economically preparing hydrogen peroxide by the use of this catalyst.

Thus; the present inventors have intensively researched to achieve the above-mentioned objects, and as a result, it has been found that (1) a catalyst obtained by supporting palladium on a silica carrier having a specific average pore diameter has a high hydrogenation activity to the anthraquinones and is less deteriorative; (2) a catalyst obtained by supporting palladium on a carrier comprising spherical silica particles of which 90% or more of which has a specific particle diameter and which has a specific average particle diameter and a specific pore volume is scarcely pulverized in a reduction reactor, can sufficiently restrain the peeling of palladium, has an excellent strength, an excellent wear resistance and a high hydrogenation activity to the anthraquinones, and is less deteriorative; and.(3) a catalyst obtained by supporting palladium and a specific amount of an alkali metal (an alkali metal compound) on the silica carrier can restrain the production of by-products during the hydrogenation of the anthraquinones without impairing strength, activity and life.

Furthermore, it has been found that when a palladium compound is supported on the silica carrier and then subjected to a heat treatment at a specific temperature in an oxygen-containing gas, a hydrogenation catalyst for the production of hydrogen peroxide can efficiently be obtained in which the peeling of palladium can be restrained and which has a high strength and activity.

In addition, it has been found that when the above-mentioned catalyst is used in the hydrogenation reaction of the anthraquinones in the hydrogen peroxide production process utilizing the anthraquinone method, hydrogen peroxide can be produced economically and advantageously on an industrial scale.

That is to say, (1) the first aspect of the present invention is directed to a hydrogenation catalyst (a hydrogenation catalyst 1) for the production of hydrogen peroxide by the hydrogenation of anthraquinones in accordance with a hydrogen peroxide production process utilizing an anthraquinone method, wherein palladium is supported on a silica carrier having an average pore diameter in the range of 80 to 400 Å, (2) the second aspect of the present invention is directed to a hydrogenation catalyst (a hydrogenation catalyst 2) for the production of hydrogen peroxide by the hydrogenation of anthraquinones in accordance with a hydrogen peroxide production process utilizing an anthraquinone method, wherein palladium is supported on a carrier comprising spherical silica particles of which at least 90 wt % of which has particle diameters in the range of 10 to 100 $\mu$m and in which an average particle diameter is in the range of 30 to 60 $\mu$m. and a pore volume is in the range of 0.4 to 1.0 ml/g, (3) the third aspect of the present invention is directed to a hydrogenation catalyst (a hydrogenation catalyst 3) for the production of hydrogen peroxide by the hydrogenation of anthraquinones in accordance with a hydrogen peroxide production process utilizing an anthraquinone method, wherein palladium and an alkali metal are supported on a silica carrier, and the amount of the alkali metal is in the range of 0.1 to 5 wt % based on the weight of the silica carrier, (4) the fourth aspect of the present invention is directed to a method for preparing a hydrogenation catalyst for the production of hydrogen peroxide by the hydrogenation of anthraquinones in accordance with a hydrogen peroxide production process utilizing an anthraquinone method, wherein a palladium compound is supported on a silica carrier, and then subjected to a heat treatment at a temperature in the range of 550 to 800° C. in an oxygen-containing gas, (5) the fifth aspect of the present invention is directed to a method for preparing a hydrogenation catalyst for the production of hydrogen peroxide by the hydrogenation of anthraquinones in accordance with a hydrogen peroxide production process utilizing an anthraquinone method, wherein a palladium compound is supported on a silica carrier and then subjected to a heat treatment at a temperature in the range of 550 to 800° C. in an oxygen-containing gas, and an alkali metal is next supported on the silica carrier in an amount of 0.1 to 5 wt % based on the weight of the silica carrier, and (6) the sixth aspect of the present invention is directed to a method for preparing hydrogen peroxide in accordance with an anthraquinone method, wherein anthraquinones are hydrogenated by the use of the hydrogenation catalyst 1, the hydrogenation catalyst 2 or the hydrogenation catalyst 3. In this connection, each of the hydrogenation catalyst 1, the hydrogenation catalyst 2 and the hydrogenation catalyst 3 can also contain the above-mentioned requirements of any of these catalysts.

DETAILED DESCRIPTION OF THE INVENTION

A hydrogenation catalyst for the production of hydrogen peroxide according to the present invention is used as a catalyst for a hydrogenation reaction of anthraquinones in a hydrogen peroxide production process utilizing an anthraquinone method.

In the hydrogen peroxide production process utilizing the anthraquinone method, a working solution containing the anthraquinones as reaction media is first subjected to a reduction treatment with hydrogen in a reduction step to hydrogenate the anthraquinones in the working solution, thereby producing corresponding anthrahydroquinones. Next, this solution subjected to the reduction treatment is subjected to an oxidation treatment with an oxygen-containing gas in an oxidation step to convert the anthrahydroquinones into corresponding anthraquinones again and to simultaneously produce hydrogen peroxide. The hydrogen peroxide in the working solution is usually extracted with water in an extraction step to separate it from the working solution. The working solution from which hydrogen peroxide has been extracted is returned to the reduction step again. In this way, the anthraquinones are repeatedly subjected to the reduction treatment and the oxidation treatment, so that hydrogen peroxide is continuously produced from hydrogen and oxygen.

The hydrogenation catalyst of the present invention is used for the purpose of hydrogenating the anthraquinones in the working solution in the reduction step in the hydrogen peroxide production process.

In the present invention, preferable examples of the anthraquinones which can be used as the reaction media include alkylanthraquinones, alkyltetrahydroanthraquinones and mixtures thereof. Each of the alkylanthraquinones and the alkyltetrahydroanthraquinones may be a mixture of a plurality of alkylanthraquinones or alkyltetrahydroanthraquinones. Examples of the alkylanthraquinones include ethyl anthraquinone, t-butylanthraquinone and amylanthraquinone. In addition, examples of the alkyltetrahydroanthraquinones include ethyltetrahydroanthraquinone, t-butyltetrahydroanthraquinone and amyltetrahydroanthraquinone.

No particular restriction is put on a solvent which can be used to prepare the working solution in the present invention, but preferable examples of the solvent include combinations of aromatic hydrocarbons and higher alcohols, combinations of aromatic hydrocarbons and carboxylic acid esters of cyclohexanol or alkylcyclohexanols, and tetrasubstituted ureas.

A hydrogenation catalyst 1 of the present invention can be obtained by supporting palladium on a silica carrier having an average pore diameter in the range of 80 to 400 Å. In this hydrogenation catalyst 1, the silica carrier should have an average pore diameter in the range of 80 to 400 Å, preferably 100 to 350 Å after the completion of all the steps of the catalyst preparation. That is to say, when the average pore diameter does not change at the time of the preparation of the catalyst, silica having an average pore diameter in the range of 80 to 400 Å, preferably 100 to 350 Å is used as the carrier, but when the average pore diameter changes by a calcination treatment or an immersion treatment in an alkali solution during the preparation of the catalyst, there is used, as the carrier, silica having such an average pore diameter that the average pore diameter of the prepared catalyst is in the range of 80 to 400 Å, preferably 100 to 350 Å.

In general, the average pore diameter of the silica carrier enlarges by the calcination treatment or the immersion treatment in the alkali solution. In addition, as a calcination temperature, an immersion temperature or an alkali concentration is high, or as a treatment time is long, an enlargement degree of the average pore diameter is usually high. Therefore, the usable range of the average pore diameter of the silica carrier depends on the treatment conditions.

In this hydrogenation catalyst 1, a particle diameter, a surface area and a pore volume of the silica carrier are not particularly restricted, and acceptable are the particle diameter, the surface area and the pore volume which silica to be used as the usual catalytic carrier has. Moreover, no particular restriction is put on the amount of palladium to be supported in this hydrogenation catalyst 1, and this amount is suitably selected in compliance with circumstances, but usually it is in the range of 0.1 to 10 wt % based on the weight of the silica carrier.

In the hydrogenation reaction of the anthraquinones, the activity of the palladium catalyst supported on the silica carrier having the average pore diameter small than in the hydrogenation catalyst 1 of the present invention rapidly deteriorates, and on the other hand, the palladium catalyst supported on the silica carrier having the average pore diameter larger than in the hydrogenation catalyst 1 has the low activity. However, as in the hydrogenation catalyst 1 of the present invention, when the palladium catalyst supported on the silica carrier having an average pore diameter of 80 to 400 Å is used in the hydrogenation reaction of the anthraquinones, the high hydrogenation activity can be obtained, and the deterioration of this activity is tardy.

On the other hand, a hydrogenation catalyst 2 of the present invention can be obtained by supporting palladium on a carrier comprising spherical silica particles in which at least 90 wt % has particle diameters in the range of 10 to 100 µm, and an average particle diameter is in the range of 30 to 60 µm, and a pore volume is in the range of 0.4 to 1.0 ml/g. The palladium catalyst supported on the silica carrier having such characteristics is scarcely pulverized in a reduction reactor, can sufficiently restrain the peeling of palladium, and has an excellent strength, an excellent wear resistance and a high hydrogenation activity. If the particle diameter of the carrier is larger than the above-mentioned range, the unsuitable pulverization of the catalyst noticeably occurs. On the other hand, if the particle diameter is smaller than the above-mentioned range, a differential pressure which is applied to a filter increases, and hence such a system is economically disadvantageous. If the pore volume is larger than the above-mentioned range, the unsuitable pulverization of the catalyst noticeably occurs, and if it is smaller than the above-mentioned range, the activity of the catalyst noticeably deteriorates unsuitably. In view of effects, particularly suitable is the palladium catalyst of the carrier comprising (1) the spherical silica particles in which at least 90 wt % has particle diameters in the range of 20 to 70 $\mu$m, and the average particle diameter is in the range of 40 to 60 $\mu$m, (2) the spherical silica particles in which the pore volume is in the range of 0.5 to 0.8 ml/g, or (3) the spherical silica particles in which at least 90 wt % has particle diameters in the range of 20 to 70 $\mu$m, and the average particle diameter is in the range of 40 to 60 $\mu$m, and the pore volume is in the range of 0.5 to 0.8 ml/g.

No particular restriction is put on the amount of palladium supported on the carrier in this hydrogenation catalyst 2, and this amount is suitably selected in compliance with circumstances, but usually it is in the range of 0.1 to 10 wt % based on the weight of the spherical silica carrier.

Furthermore, a hydrogenation catalyst 3 of the present invention can be obtained by supporting palladium and 0.1 to 5 wt % of an alkali metal on a silica carrier. The palladium catalyst supported on the silica carrier having such characteristics can effectively restrain the production of by-products during the hydrogenation of the anthraquinones without impairing strength, activity and life. If the amount of the supported alkali metal is less than 0.1 wt %, the production restraint effect of the by-products cannot sufficiently be exerted, and if this amount is more than 5 wt %, the activity, the strength and the life of the catalyst are liable to deteriorate.

No particular restriction is put on the alkali metal in this hydrogenation catalyst 3, so long as it is an alkali metal in the group 1 of the periodic table, but sodium, potassium and a combination of both are preferable. In addition, a particle diameter, a surface area, a pore volume and a pore diameter of the silica carrier are not particularly restricted, and acceptable are the particle diameter, the surface area and the pore volume of silica which can be used as the usual catalytic carrier.

No particular restriction is put on an amount of the supported palladium in this hydrogenation catalyst 3, and this amount is suitably selected in compliance with circumstances, but usually it is in the range of 0.1 to 10 wt % based on the weight of the silica carrier. Moreover, no particular restriction is put on the order of the supporting of the palladium and the alkali metal on the silica carrier, they may simultaneously supported, or either of them may firstly be supported.

No particular restriction is put on the preparation methods of the above-mentioned hydrogenation catalysts 1, 2 and 3, and known methods which have usually been employed for the conventional manufacture of the palladium catalyst supported on silica can be used. However, according to a method of the present invention which will hereinafter be described, the palladium catalyst supported on silica having a high strength and a high hydrogenation activity can efficiently be prepared.

In the preparation method of the hydrogenation catalyst according to the present invention, a palladium compound is supported on the silica carrier, and then subjected to a heat treatment at a temperature in the range of 550 to 800° C. in an oxygen-containing gas. Here, the oxygen-containing gas is not particularly restricted, and any gas containing oxygen is acceptable. However, air is preferable from an economical viewpoint. If the temperature for the heat treatment is less than 550° C., the activity of the obtained catalyst is high, but a palladium peeling restraint effect cannot sufficiently be exerted, and on the other hand, if it is more than 800° C., palladium is scarcely peeled off from the obtained catalyst, but its activity deteriorates.

This reason is not definite, but it can be presumed that if the temperature for the heat treatment is less than 550° C., the palladium compound supported on silica is not sufficiently oxidized and decomposed, so that the peeling of palladium takes place, and if this temperature is more than 550° C., the palladium compound is sufficiently oxidized and decomposed to form palladium oxide, so that the peeling of palladium can be restrained. Furthermore, it can also be presumed that if the temperature for the heat treatment is more than 800° C., the surface area of palladium decreases, with the result that the activity of the catalyst also deteriorates.

The temperature for the heat treatment is particularly preferably in the range of 600 to 700° C. from the viewpoint of a balance between the palladium peeling restraint effect and the catalytic activity. In addition, the amount of the oxygen-containing gas to be fed depends on the amount of the catalyst to be subjected to the heat treatment, but this amount should be not less than an amount required to oxidize the palladium compound. No particular restriction is put on a technique for feeding the oxygen-containing gas, and either of a batch system and a circulation system is acceptable. In the heat treatment, in order to volatilize volatile components contained in the solvent and the palladium compound used to support the palladium compound on the silica carrier, the heat treatment may previously be carried out at a temperature of room temperature to about 550° C. in an inert gas such as nitrogen, if necessary.

A time for the heat treatment with the oxygen-containing gas depends on the amount of the catalyst to be treated, the amount of the oxygen-containing gas to be fed and the treatment temperature, and so it cannot be decided sweepingly. The completion of the heat treatment can easily visually be judged by the brown color of palladium oxide formed on the catalyst. In this heat treatment, no particular restriction is put on a temperature rising velocity of from room temperature to 550–800° C. and a temperature lowering velocity of from 550–800° C. to room temperature.

As the silica carrier for use in the preparation method of the present invention, silica which can usually be used as the catalyst carrier is acceptable without any restriction, but when there is used such a silica carrier that an average pore diameter is in the range of 80 to 400 Å after the completion of all the steps of the catalyst preparation, the above-mentioned hydrogenation catalyst 1 can be obtained. In addition, when there are used, as the silica carrier, spherical silica particles whose at least 90 wt % has particle diameters in the range of 10 to 100 $\mu$m and which has an average particle diameter in the range of 30 to 60 $\mu$m and a pore volume in the range of 0.4 to 1.0 ml/g, the above-mentioned hydrogenation catalyst 2 can be obtained.

In the preparation method of the present invention, supporting the palladium compound on the silica carrier can be accomplished by an impregnation method or an ion exchange method which comprises adsorbing a palladium compound ion on the silica carrier by ion exchange, and the ion exchange method is particularly suitable.

In order to support the palladium compound on the silica carrier by the ion exchange method, the silica carrier is first brought into contact with a solution containing an ammonium ion to ion-exchange with the ammonium ion, and it is then brought into contact with a solution of the palladium compound to ion-exchange with the ion containing palladium. The ion exchange with the ammonium ion and the ion exchange with the ion containing palladium may be carried out in different solutions, but they may simultaneously done in one solution. After the ion containing palladium has been supported by the ion exchange, the above-mentioned heat treatment is carried out to form palladium oxide, and as needed, a reduction treatment may be done to obtain palladium metal.

The above-mentioned solution containing the ammonium ion should contain the ammonium ion in an amount required to support the desired amount of palladium. The palladium compound to be used should be a compound which can become a cation containing palladium in the solution, and typical examples of the palladium compound include salts of a palladium complex cation such as tetraaminepalladium (II) chloride-hydrate, and palladium chloride and palladium nitrate which become a complex cation in an ammonium solution.

In order to support palladium on the carrier by the impregnation method, the silica particles are immersed in a solution containing the palladium compound, and a solvent is then evaporated. Afterward, the above-mentioned heat treatment is carried out to produce palladium oxide, and if necessary, the reduction treatment is further done to convert the palladium oxide compound into palladium metal.

The palladium compound for use in the supporting of palladium according to this method should be a palladium compound which can dissolve in water or a solvent such as an organic solvent. Typical examples of the palladium compound include palladium salts such as palladium chloride, palladium nitrate, palladium acetate and palladium (II) acetylacetonate, and palladium complex salts such as ammonium tetrachloropalladate and tetraaminepalladium (II) chloride-hydrate.

In the case that the organic solvent is used as the solvent, an oil-soluble palladium compound can be used. Typical examples of the oil-soluble palladium compound include palladium acetate and palladium (II) acetylacetonate, but they are not restrictive. No particular restriction is put on the organic solvent, and any organic solvent is acceptable, so long as it can dissolve the palladium compound.

In the thus obtained palladium catalyst supported on the silica carrier, the amount of palladium to be supported is usually in the range of 0.1 to 10 wt % based on the weight of the silica carrier. The amount of supported palladium can be determined by fluorescent X-ray.

In the method of the present invention, to the thus obtained palladium catalyst supported on the silica carrier, an alkali metal can further be supported in an amount of 0.1 to 5 wt % based on the weight of the silica carrier to efficiently prepare the above-mentioned hydrogenation catalyst 3.

Supporting this alkali metal can be accomplished by bringing the silica carrier supporting palladium into contact with a solution containing an alkali metal compound, suitably a solution containing a sodium compound or a potassium compound, washing the carrier with water if necessary, and then drying or calcining it. At this time, in the finally prepared catalyst, 0.1 to 5 wt % of the alkali metal can be supported on the silica carrier.

As a technique of bringing the silica carrier supporting palladium into contact with the solution containing the alkali metal compound, there are a method which comprises filling a column with the silica carrier, and then allowing the solution to flow therethrough, and a method which comprises immersing the silica carrier in the solution. In addition, the solution containing the alkali metal compound should contain the alkali metal compound in an amount required to support 0.1 to 5 wt % of the alkali metal on the above-mentioned silica carrier. If the highly concentrated solution is used, silica dissolves in a certain case. In such a case, it is preferable to use the dilute solution. However, even when the highly concentrated solution is used, the dissolution of silica can be restrained by shortening a contact time or lowering a contact temperature. The amount of the supported alkali metal can be determined by fluorescent X-ray.

In this way, the hydrogenation catalyst 3 can be obtained, but this hydrogenation catalyst 3 can also be prepared by a method other than the above-mentioned method of the present invention, for example, a method which comprises first supporting the alkali metal on the silica carrier, and then supporting palladium thereon, or a method which comprises simultaneously supporting the alkali metal and palladium thereon. The present invention also intends to provide a method for preparing hydrogen peroxide which comprises using the above-mentioned hydrogenation catalyst 1, 2 or 3 in the reduction step in the hydrogen peroxide production process utilizing the anthraquinone method to hydrogenate the anthraquinones in the working solution.

In the production method of hydrogen peroxide according to the present invention, the working solution which can be used in the reduction step contains the anthraquinones as reaction media as described above, and examples of the preferably usable anthraquinones include alkylanthraquinones, alkyltetrahydroanthraquinones and mixtures thereof. When the mixture of the alkylanthraquinones and the alkyltetrahydroanthraquinones is used as the alkylanthraquinones, a weight ratio of the alkylanthraquinones to the alkyltetrahydroanthraquinones is preferably in the range of 2:1 to 8:1, more preferably 3:1 to 6:1. No particular restriction is put on the concentration of the above-mentioned anthraquinones in the working solution, and it can suitably be selected in compliance with circumstances, but it is usually in the range of 0.4 to 1.0 mol/liter.

In this reduction step, the hydrogenation catalyst 1, 2 or 3 of the present invention can be used for the hydrogenation reaction of the anthraquinones. In this case, no particular restriction is put on the amount of the catalyst to be used, and it can suitably be selected in compliance with circumstances, but it is usually in the range of 5 to 70 g per liter of the working solution. Furthermore, no particular restriction is put on the conditions of the hydrogenation reaction, but the hydrogenation can usually be accomplished at a temperature of about 10 to 80° C. under a pressure of about 1 to 5 atm with hydrogen or a hydrogen-containing gas. As a reactor, any of a fixed bed type, a fluidized bed type and a stirrer-equipped type can be used.

The working solution in which the anthraquinones have been reduced to corresponding anthrahydroquinones in this way is, after the removal of the catalyst, subjected to an oxidation treatment with an oxygen-containing gas in an ordinary manner in an oxidation step. By this oxidation treatment, the anthrahydroquinones are oxidized to corresponding anthraquinones and simultaneously hydrogen peroxide is produced. From the working solution subjected to the oxidation treatment, hydrogen peroxide is extracted with water in an ordinary manner, and the hydrogen peroxide-free working solution is circulated through the reduction step again.

The hydrogenation catalyst for the hydrogen peroxide production of the present invention is the palladium catalyst supported on the silica carrier which is excellent in activity, strength, life and the like, and this catalyst can be used for the hydrogenation reaction of the anthraquinones in the hydrogen peroxide production process utilizing the anthraquinone method to economically produce hydrogen peroxide. In addition, according to the present invention, the hydrogenation catalyst for the hydrogen peroxide production which can restrain the peeling of palladium and which has a high strength and a high activity can efficiently be obtained.

Next, the present invention will be described in more detail with reference to examples, but the scope of the present invention should not be limited by these examples at all.

EXAMPLE 1

A silica gel CARiACT Q-10 (a spherical silica gel having an average pore diameter of 112 Å) made by Fuji Silysia Chemical Ltd. was screened so as to be in the range of 200 to 350 mesh. Afterward, 50 g of this silica gel was suspended in 170 ml of 25 wt % aqueous ammonia at room temperature. While the resulting suspension was stirred, a solution obtained by dissolving 0.835 g of palladium chloridin 30 ml of 25 wt % aqueous ammonia was added dropwise to the suspension. Next, this suspension was filtered, and the silica gel collected by the filtration was washed with 500 ml of pure water, and then dried at 120° C. for 12 hours. Furthermore, the dried silica gel was calcined at 600° C. for 3 hours. Next, the silica gel was suspended in 170 ml of pure water, and a 4 wt % aqueous sodium hydroxide solution was added until pH 9 had been attained. Afterward, 5 ml of a 37 wt % formaldehyde solution was added, and the temperature of the suspension was raised up to 60° C., followed by continuous stirring for 30 minutes. During this operation, a 4 wt % sodium hydroxide solution was added so as to become pH 9. Next, the suspension was filtered, and the resulting catalyst was washed with 1500 ml of pure water, and then dried at 120° C. for 12 hours. The thus treated catalyst had an average pore diameter of 125 Å.

For the obtained catalyst, a hydrogen partial pressure during the continuous hydrogenation of anthraquinones was measured by the use of a circulation type reactor to evaluate a catalytic activity and a deterioration rate. The results are shown in Table 1. In this connection, the average pore diameter was measured by a gas adsorption method (ASAP 2000, made by Micromeritics Instrument Corporation).

[Evaluation of catalytic activity and deterioration rate]

One liter of a working solution and 10 g of the catalyst to be tested were placed in a circulation type reactor having an internal volume of about 1.5 liters. The working solution was prepared by dissolving amylanthraquinone in a mixed solvent comprising 60 vol % of 1,2,4-trimethylbenzene and 40 vol % of diisobutylcarbinol so that the concentration of amylanthraquinone might be 0.60 mol/l.

Next, the reactor was purged with nitrogen, while the working solution including the suspended catalyst was stirred by a stirrer attached to the reactor, and hydrogen was then blown at 240 ml/min into the reactor through its bottom to start a hydrogenation reaction. After 30 minutes had lapsed from the start of the reaction, the circulation of a working solution having the same composition as in the above-mentioned working solution was begun. The circulation rate of the working solution was set to 2 liters/hr. The hydrogenated working solution was drawn through a candle filter attached to the reactor, while the amount of the working solution in the reactor was constantly maintained by the use of a level gage. The stirring of the working solution was carried out by inclined turbine blades, and two baffles were provided on the wall surface of the reactor to secure sufficient mixing. The temperature of the working solution in the reactor was set to 40° C.

The activity of the catalyst was evaluated on the basis of a hydrogen partial pressure (hereinafter referred to as "the initial hydrogen partial pressure") immediately after the start of the circulation of the working solution, and the activity deterioration of the catalyst was evaluated on the basis of an increase rate of the hydrogen partial pressure. According to these evaluations, it was apparent that the higher the activity of the catalyst is, the lower the initial hydrogen partial pressure is, and the smaller the activity deterioration of the catalyst is, the lower the increase rate of the hydrogen partial pressure is.

The hydrogen partial pressure in the reactor during the reaction was traced on the basis of the pressure and the composition of the gas in the reactor. The pressure in the reactor was measured by a pressure gage, and the composition of the gas in the reactor was measured by sampling the gas successively, and then subjecting the gas sample to gas chromatography.

EXAMPLE 2

The same procedure as in Example 1 was conducted except that a silica gel CARiACT Q-15 (a spherical silica gel having an average pore diameter of 178 Å) made by Fuji Silysia Chemical Ltd. was used as silica, thereby preparing a catalyst. The thus prepared catalyst had an average pore diameter of 198 Å. For the obtained catalyst, evaluation was made in the same manner as in Example 1. The results are shown in Table 1.

EXAMPLE 3

The same procedure as in Example 1 was conducted except that a silica gel CARiACT Q-30 (a spherical silica gel having an average pore diameter of 290 Å) made by Fuji Silysia Chemical Ltd. was used as silica, thereby preparing a catalyst. The thus prepared catalyst had an average pore diameter of 302 Å. For the obtained catalyst, evaluation was made in the same manner as in Example 1. The results are shown in Table 1.

COMPARATIVE EXAMPLE 1

The same procedure as in Example 1 was conducted except that a silica gel CARiACT Q-50 (a spherical silica gel having an average pore diameter of 493 Å) made by Fuji Silysia Chemical Ltd. was used as a control, thereby preparing a catalyst. The thus prepared catalyst had an average pore diameter of 500 Å. For the obtained catalyst, evaluation was made in the same manner as in Example 1. The results are shown in Table 1.

COMPARATIVE EXAMPLE 2

The same procedure as in Example 1 was conducted except that a silica gel CARiACT Q-3 (a spherical silica gel having an average pore diameter of 28 Å) made by Fuji Silysia Chemical Ltd. was used as a control, thereby preparing a catalyst. The thus prepared catalyst had an average pore diameter of 32 Å. For the obtained catalyst, evaluation was made in the same manner as in Example 1. The results are shown in Table 1.

COMPARATIVE EXAMPLE 3

The same procedure as in Example 1 was conducted except that a silica gel CARIACT Q-6 (a spherical silica gel having an average pore diameter of 64 Å) made by Fuji Silysia Chemical Ltd. was used as a control, thereby preparing a catalyst. The thus prepared catalyst had an average pore diameter of 72 Å. For the obtained catalyst, evaluation was made in the same manner as in Example 1. The results are shown in Table 1.

TABLE 1

|  | Pd (wt %) | Average Pore Diameter (Å) | Initial Hydrogen Partial Pressure (kgf/cm$^2$) | Deterioration Rate (kgf/cm$^2$/hr) |
|---|---|---|---|---|
| Example 1 | 1.0 | 125 | 0.25 | 0.01 |
| Example 2 | 1.0 | 198 | 0.24 | 0.01 |
| Example 3 | 1.0 | 302 | 0.21 | 0.03 |
| Comp. Ex. 1 | 1.0 | 500 | 0.45 | 0.02 |
| Comp. Ex. 2 | 1.0 | 32 | 3.00 | 5.90 |
| Comp. Ex. 3 | 1.0 | 72 | 0.56 | 0.10 |

EXAMPLE 4

16.7 g of palladium chloride was weighed and then placed in a 500-ml Erlenmeyer flask, and it was then dissolved in 270 ml of 25 wt % aqueous ammonia under heating. Afterward, the temperature of the solution was returned to room temperature, and the volume of the palladium chloride solution was then brought to 300 ml with used aqueous ammonia, thereby preparing an aqueous palladium chloride solution.

In a 5-liter separable flask was placed 500 g of a silica carrier (CARIACT Q-10, made by Fuji Silysia Chemical Ltd.) whose 91 wt % had a particle diameter in the range of 10 to 100 μm and in which an average particle diameter was 45 μm and a pore volume was 0.74 ml/g. Next, 1.7 liters of a 25 wt % aqueous solution was added, followed by stirring. 300 ml of the already prepared aqueous palladium chloride solution was added dropwise thereto at room temperature at a rate of 20 ml/min through a dropping funnel. Afterward, the carrier was collected by filtration with suction, washed with 2.5 liters of pure water at 70 to 75° C., and then dried at 120° C. for 24 hours. By the above-mentioned operation, palladium was supported on the silica carrier. Next, the silica carrier on which palladium was supported was placed in an electric furnace, and it was calcined up to 200° C. under a nitrogen atmosphere, and then calcined at 600° C. under air.

The calcined silica carrier on which palladium was supported was placed in the separable flask, and 1.5 liters of pure water was further added, followed by stirring at room temperature. Here, a 4 wt % aqueous NaOH solution was added through a dropping funnel until the pH of the solution had reached 9.5±0.1, and when the pH had been stabilized, 50 ml of a 37 wt % formaldehyde solution was added. A 4 wt % aqueous NaOH solution was added dropwise so that the pH might be 9.5±0.1. Next, the solution was heated until a solution temperature had reached 60±1° C., and then stirred for 30 minutes, while the solution temperature was maintained. Also during this operation, the 4 wt % aqueous NaOH solution was added dropwise so that the desired pH might be kept up. Afterward, the silica carrier was washed with 3 liters of pure water, and then dried at 120° C. for 24 hours, thereby obtaining a catalyst in which 2.0 wt % of palladium was supported on the silica carrier.

Next, 200 g of the catalyst was used, and anthraquinones were subjected to a reduction reaction in the following manner in a mechanical stirrer-equipped reactor. An initial hydrogen partial pressure was 0.7 kgf/cm$^2$, and the rise of a differential pressure in one month was 0.02 kgf/cm$^2$. The concentration of palladium in an extracted liquid was 0.3 ppb.

In this connection, as the pore volume of the carrier, a value measured by an aqueous titration method was employed, and as the average particle diameter, a value measured by a laser diffraction type particle size distribution measuring instrument was employed. A palladium concentration in hydrogen peroxide was measured by an atomic absorption photometer, and a gas composition in the reactor was measured by sampling the gas successively, and then measuring its composition by gas chromatography.

Furthermore, with regard to the particle diameter of the carrier, purchased silica was used as it was, or the particle diameter was optionally regulated by the use of a suitable standard sieve.

[Reduction reaction of the anthraquinones]

For the reduction of the anthraquinones, there was used the same device for circulating the working solution as in the industrialized anthraquinone method. That is to say, this device was a circulating installation comprising a step for reducing the anthraquinones in the presence of the palladium catalyst, a step for oxidizing anthrahydroquinones obtained in the reduction step with air, and a step for extracting hydrogen peroxide obtained in the oxidation step with water. In this installation, the working solution was circulated at 15 liters/hr, and in the reduction step, hydrogen was blown at 108 N liters/hr and the reaction was carried out at a temperature of 40° C. The pulverization of the catalyst was evaluated on the basis of the rise of a differential pressure on a filter in a reduction reactor. The filter was constituted of two cylinders of a metallic mesh having a mesh size of 20 μm, and it was used, while suitably washed in a reverse direction. In this case, it was apparent that when the differential pressure largely rose, the catalyst was more pulverized. The peeling of palladium was evaluated on the basis of the palladium concentration in the extracted liquid. In addition, the activity of the catalyst was evaluated on the basis of a degree of the hydrogen partial pressure under conditions of an equal reaction quantity. The hydrogen partial pressure after one day from the start of the reaction was regarded as an initial hydrogen partial pressure. In this case, when the hydrogen partial pressure is low, the activity of the catalyst is high.

Furthermore, as the working solution, there was used a solution obtained by dissolving amylanthraquinone in a mixed solvent of 60 vol % of 1,2,4-trimethylbenzene and 40 vol % of diisobutylcarbinol so that the concentration of amylanthraquinone might be 0.60 mol/l.

EXAMPLE 5

A silica carrier used in Example 4 (CARIACT Q-10 made by Fuji Silysia Chemical Ltd.) was screened to obtain a silica carrier whose 91 wt % had a particle diameter in the range of 20 to 70 μm and in which an average particle diameter was 45 μm and a pore volume was 0.74 ml/g. The same procedure as in Example 4 was conducted except that this carrier was used, thereby preparing a catalyst, and the reduction reaction of anthrahydroquinones was then carried out. An initial hydrogen partial pressure was 0.7 kgf/cm$^2$, and the rise of a differential pressure in one month was 0.01 kgf/cm$^2$. The concentration of palladium in an extracted liquid was 0.2 ppb.

EXAMPLE 6

The same procedure as in Example 4 was conducted except that there was used a silica carrier (CARiACT Q-10 made by Fuji Silysia Chemical Ltd.) whose 93 wt % had a particle diameter in the range of 10 to 100 μm and in which an average particle diameter was 54 μm and a pore volume was 0.78 ml/g, thereby preparing a catalyst, and the reduction reaction of anthrahydroquinones was then carried out. An initial hydrogen partial pressure was 0.7 kgf/cm$^2$, and the rise of a differential pressure in one month was 0.02 kgf/cm$^2$. The concentration of palladium in an extracted liquid was 0.3 ppb.

COMPARATIVE EXAMPLE 4

The same procedure as in Example 4 was conducted except that there was used a silica carrier (CARiACT Q-10 made by Fuji Silysia Chemical Ltd.) whose 75 wt % had a particle diameter in the range of 10 to 100 μm and in which an average particle diameter was 80 μm and a pore volume was 1.11 ml/g, thereby preparing a catalyst, and the reduction reaction of anthrahydroquinones was then carried out. An initial hydrogen partial pressure was 0.9 kgf/cm$^2$, and the rise of a differential pressure in one month was 0.22 kgf/cm$^2$. The concentration of palladium in an extracted liquid was 4.0 ppb.

COMPARATIVE EXAMPLE 5

The same procedure as in Example 4 was conducted except that there was used a silica carrier (CARiACT Q-15 made by Fuji Silysia Chemical Ltd.) whose 90 wt % had a particle diameter in the range of 10 to 100 μm and in which an average particle diameter was 52 μm and a pore volume was 1.18 ml/g, thereby preparing a catalyst, and the reduction reaction of anthrahydroquinones was then carried out. An initial hydrogen partial pressure was 0.8 kgf/cm$^2$, and the rise of a differential pressure in one month was 0.12 kgf/cm$^2$. The concentration of palladium in an extracted liquid was 1.5 ppb.

COMPARATIVE EXAMPLE 6

A silica carrier (CARIACT Q-10 made by Fuji Silysia Chemical Ltd.) was screened to obtain a silica carrier whose 80 wt % had a particle diameter in the range of 10 to 100 μm and in which an average particle diameter was 57 μm and a pore volume was 0.78 ml/g. The same procedure as in Example 4 was conducted except that this carrier was used, thereby preparing a catalyst, and the reduction reaction of anthrahydroquinones was then carried out. An initial hydrogen partial pressure was 0.8 kgf/cm$^2$, and the rise of a differential pressure in one month was 0.09 kgf/cm$^2$. The concentration of palladium in an extracted liquid was 1.0 ppb.

COMPARATIVE EXAMPLE 7

A silica carrier (CARIACT Q-3 made by Fuji Silysia Chemical Ltd.) was screened to obtain a silica carrier whose 90 wt % had a particle diameter in the range of 10 to 100 μm and in which an average particle diameter was 50 μm and a pore volume was 0.34 ml/g. The same procedure as in Example 4 was conducted except that this carrier was used, thereby preparing a catalyst, and the reduction reaction of anthrahydroquinones was then carried out. An initial hydrogen partial pressure was 2.1 kgf/cm$^2$, and the rise of a differential pressure in one month was 0.01 kgf/cm$^2$. The concentration of palladium in an extracted liquid was 0.3 ppb.

EXAMPLE 7

The same procedure as in Example 4 was conducted except that the amount of an aqueous palladium chloride solution to be dropwise added at the supporting of palladium was twice, i.e., 600 ml, thereby preparing a catalyst on which 4.0 wt % of palladium was supported. Afterward, the reduction reaction of anthrahydroquinones was then carried out. An initial hydrogen partial pressure was 0.5 kgf/cm$^2$, and the rise of a differential pressure in one month was 0.02 kgf/cm$^2$. The concentration of palladium in an extracted liquid was 0.5 ppb.

EXAMPLE 8

The same procedure as in Example 4 was conducted except that the amount of an aqueous palladium chloride solution to be dropwise added at the supporting of palladium was 1/2, i.e., 150 ml, thereby preparing a catalyst on which 1.0 wt % of palladium was supported. Afterward, the reduction reaction of anthrahydroquinones was then carried out. An initial hydrogen partial pressure was 0.9 kgf/cm$^2$, and the rise of a differential pressure in one month was 0.02 kgf/cm$^2$. The concentration of palladium in an extracted liquid was 0.3 ppb.

COMPARATIVE EXAMPLE 8

An alumina carrier (Neobead C made by Mizusawa Chemical Co., Ltd.) was screened to obtain a carrier whose 92 wt % had a particle diameter in the range of 10 to 100 μm and in which an average particle diameter was 55 μm, and the same procedure as in Example 1 was conducted except that this carrier was used, thereby preparing a catalyst. Afterward, the reduction reaction of anthrahydroquinones was carried out. An initial hydrogen partial pressure was 1.1 kgf/cm$^2$, and the rise of a differential pressure in one month was 0.32 kgf/cm$^2$. The concentration of palladium in an extracted liquid was 13.0 ppb.

The results of Examples 4 to 8 and Comparative Examples 4 to 8 are shown in Table 2 and Table 3.

TABLE 2

| | Example 4 | Example 5 | Example 6 | Comp. Ex. 4 | Comp. Ex. 5 |
|---|---|---|---|---|---|
| Catalyst | CARiACT Q-10 | Screened CARiACT Q-10 | CARiACT Q-10 | CARiACT Q-10 | CARiACT Q-15 |
| Average Particle Diameter (μm) of Carrier | 45 | 45 | 54 | 80 | 52 |
| Pore Volume (ml/g) | 0.74 | 0.74 | 0.78 | 1.11 | 1.18 |
| Particle Diameter Distribution | 91% had 10–100 μm | 91% had 20–70 μm | 93% had 10–100 μm | 75% had 10–100 μm | 90% had 10–100 μm |

TABLE 2-continued

|  | Example 4 | Example 5 | Example 6 | Comp. Ex. 4 | Comp. Ex. 5 |
|---|---|---|---|---|---|
| Amount of Supported PD (wt %) | 2 | 2 | 2 | 2 | 2 |
| Initial Hydrogen Partial Pressure (kgf/cm$^2$) | 0.7 | 0.7 | 0.7 | 0.9 | 0.8 |
| Differential Pressure (kgf/cm$^2$) | 0.02 | 0.01 | 0.02 | 0.22 | 0.12 |
| Pd Conc. (ppb) | 0.3 | 0.2 | 0.3 | 4.0 | 1.5 |

TABLE 3

|  | Comp. Ex. 6 | Comp. Ex. 7 | Example 7 | Example 8 | Comp. Ex. 8 |
|---|---|---|---|---|---|
| Catalyst | Screened CARiACT Q-10 | CARiACT Q-3 | CARiACT Q-10 | CARiACT Q-10 | Screened Neobead C |
| Average Particle Diameter ($\mu$m) of Carrier | 57 | 50 | 45 | 45 | 55 |
| Pore Volume (ml/g) | 0.78 | 0.34 | 0.74 | 0.74 | 0.80 |
| Particle Diameter Distribution | 80% had 10–100 $\mu$m | 90% had 20–100 $\mu$m | 91% had 10–100 $\mu$m | 91% had 10–100 $\mu$m | 92% had 10–100 $\mu$m |
| Amount of Supported PD (wt %) | 2 | 2 | 4 | 1 | 2 |
| Initial Hydrogen Partial Pressure (kgf/cm$^2$) | 0.8 | 2.1 | 0.5 | 0.9 | 1.1 |
| Differential Pressure (kgf/cm$^2$) | 0.09 | 0.01 | 0.02 | 0.02 | 0.32 |
| Pd Conc. (ppb) | 1.0 | 0.3 | 0.5 | 0.3 | 13.0 |

EXAMPLE 9

A silica gel CARIACT Q-10 made by Fuji Silysia Chemical Ltd. was screened by a sieve so as to be in the range of 200 to 350 mesh. Afterward, 200 g of this silica gel was suspended in 680 ml of 25 wt % aqueous ammonia at room temperature. While the resulting suspension was stirred, a solution obtained by dissolving 3.35 g of palladium chloride in 120 ml of 25 wt % aqueous ammonia was added dropwise to the suspension. Next, this suspension was filtered, and the silica gel collected by the filtration was washed with 2000 ml of pure water, and then dried at 120° C. for 12 hours. Furthermore, the silica gel was calcined at 600° C. for 3 hours. Next, the calcined silica gel was suspended in 680 ml of pure water, and a 4 wt % aqueous sodium hydroxide solution was added until pH 9 had been attained. Afterward, 20 ml of a 37 wt % formaldehyde solution was added, and the temperature of the suspension was raised up to 60° C., followed by continuous stirring for 30 minutes. During this operation, a 4 wt % sodium hydroxide solution was added so as to become pH 9. Next, the suspension was filtered, and the resulting catalyst washed with 2000 ml of pure water, and then dried at 120° C. for 12 hours. A sodium content in the catalyst was 0.56 wt %. The thus prepared catalyst was evaluated in the following manner. An initial hydrogen partial pressure was 0.6 kgf/cm$^2$, and when operation was carried out for 200 hours, the increase in the hydrogen partial pressure was scarcely observed. The results of production ratios of by-products are shown in Table 4.

[Evaluation of the catalyst]

The evaluation of the production of the by-products in the catalyst was made by the use of a circulating installation in which a working solution was circulated through a reduction step, an oxidation step and an extraction step to produce hydrogen peroxide.

150 g of the catalyst to be tested was placed in a hydrogenation reactor in a reduction step of the above-mentioned circulating installation, and the hydrogenation of anthraquinones was continuously carried out to produce hydrogen peroxide. The volume of the working solution in the hydrogenation reactor was maintained at about 4 liters, and the working solution and hydrogen were fed at 0.25 liter/min and 1.8 liters/min, respectively. The working solution in which the anthraquinones were hydrogenated was separated from the catalyst through a candle filter, and then drawn from the hydrogenation reactor. Stirring was done by inclined turbine blades, and sufficient mixing could be accomplished by baffles provided on the wall surface of the reactor. A reaction temperature for the hydrogenation reaction was set to 40° C.

As the working solution, there was used a solution obtained by dissolving amylanthraquinone in a mixed solvent of 60 vol % of 1,2,4-trimethylbenzene and 40 vol % of diisobutylcarbinol so that the concentration of amylanthraquinone might be 0.60 mol/l. The total volume of the working solution in the circulating installation was set to about 50 liters.

The activity of the catalyst was evaluated on the basis of a hydrogen partial pressure after 24 hours from the start of the reaction (hereinafter referred to as "the initial hydrogen partial pressure"), and the activity deterioration of the catalyst was evaluated on the basis of an increased rate of the hydrogen partial pressure. According to these evaluations, it was apparent that the higher the activity of the catalyst is, the lower the initial hydrogen partial pressure is, and the smaller the activity deterioration of the catalyst is, the lower the increase rate of the hydrogen partial pressure is.

Furthermore, after the production of hydrogen peroxide had been carried out for 200 hours in the circulating reactor, concentrations of amylanthraquinone, amyloxanthrone and amyltetrahydroanthraquinone were measured by the use of liquid chromatography. On the basis of the measured concentrations, the productions of by-products such as amyloxanthrone and amyltetrahydroanthraquinone were calculated to determine ratios of the by-products to the production of the main product.

EXAMPLE 10

The supporting, drying and calcination of palladium were carried out by the same procedure as in Example 9. Next, the resulting catalyst was suspended in 2000 ml of a 0.5 wt % sodium hydroxide solution, and the suspension was then stirred at 60° C. for 30 minutes. Afterward, the catalyst was collected by filtration, and then washed with 1000 ml of pure water. Next, the catalyst was dried at 120° C. for 12 hours. A sodium content in the catalyst was 0.41 wt %. The prepared catalyst was evaluated in the same manner as in Example 9. An initial hydrogen partial pressure was 0.6 kgf/cm$^2$, and when operation was carried out for 200 hours, the increase in the hydrogen partial pressure was scarcely observed. The results of production ratios of by-products are shown in Table 4.

EXAMPLE 11

The supporting, drying and calcination of palladium were carried out by the same procedure as in Example 9. Next, a glass column was filled with the calcined catalyst, and 4000 ml of a 3 wt % aqueous sodium carbonate solution an 4000 ml of pure water were then passed through the column at room temperature. Afterward, the column was dried at 120° C. for 12 hours. A sodium content in the catalyst was 0.67 wt %. The prepared catalyst was evaluated in the same manner as in Example 9. An initial hydrogen partial pressure was 0.6 kgf/cm$^2$, and when operation was carried out for 200 hours, the increase in the hydrogen partial pressure was scarcely observed. The results of production ratios of by-products are shown in Table 4.

EXAMPLE 12

The supporting, drying and calcination of palladium were carried out by the same procedure as in Example 9. Next, the resulting catalyst was immersed in 400 ml of a 0.1 wt % sodium hydroxide, and then heated to dryness on a hot water bath. Afterward, the catalyst was dried at 120° C. for 12 hours. A sodium content in the catalyst was 0.13 wt %. The prepared catalyst was evaluated in the same manner as in Example 9. An initial hydrogen partial pressure was 0.6 kgf/cm$^2$, and when operation was carried out for 200 hours, the increase in the hydrogen partial pressure was scarcely observed. The results of production ratios of by-products are shown in Table 4.

EXAMPLE 13

A catalyst was prepared by the same procedure as in Example 9 except that a 4 wt % sodium hydroxide solution was replaced with a 4 wt% potassium hydroxide solution. A potassium content in the catalyst was 0.43 wt %. The prepared catalyst was evaluated in the same manner as in Example 9. An initial hydrogen partial pressure was 0.6 kgf/cm$^2$, and when operation was carried out for 200 hours, the increase in the hydrogen partial pressure was scarcely observed. The results of production ratios of by-products are shown in Table 4.

EXAMPLE 14

A catalyst was prepared by the same procedure as in Example 9 except that a 4 wt % sodium hydroxide solution was replaced with a 4 wt % potassium carbonate solution. A potassium content in the catalyst was 0.52 wt %. The prepared catalyst was evaluated in the same manner as in Example 9. An initial hydrogen partial pressure was 0.6 kgf/cm$^2$, and when operation was carried out for 200 hours, the increase in the hydrogen partial pressure was scarcely observed. The results of production ratios of by-products are shown in Table 4.

COMPARATIVE EXAMPLE 9

As a control, there was prepared a palladium catalyst supported on silica in which the content of an alkali metal was less than 0.1 wt %. The supporting, drying and calcination of palladium were carried out by the same procedure as in Example 9, and next, the catalyst was immersed in 400 ml of a 0.05 wt % sodium hydroxide, and then heated to dryness on a hot water bath. Afterward, the catalyst was dried at 120° C. for 12 hours. A sodium content in the catalyst was 0.07 wt %. The prepared catalyst was evaluated in the same manner as in Example 9. An initial hydrogen partial pressure was 0.6 kgf/cm$^2$, and when operation was carried out for 200 hours, the increase in the hydrogen partial pressure was scarcely observed. The results of production ratios of by-products are shown in Table 4.

COMPARATIVE EXAMPLE 10

As a control, there was prepared a palladium catalyst supported on silica by supporting, drying and calcinating palladium in accordance with the same procedure as in Example 9 but by not doing any subsequent treatments. An alkali metal content in the catalyst was 0.01 wt %. The prepared catalyst was evaluated in the same manner as in Example 9. An initial hydrogen partial pressure was 0.6 kgf/cm$^2$, and when operation was carried out for 200 hours, the increase in the hydrogen partial pressure was scarcely observed. The results of production ratios of by-products are shown in Table 4.

COMPARATIVE EXAMPLE 11

As a control, a normal palladium catalyst supported on alumina was prepared by the following procedure. 200 g of γ-alumina screened so as to be in the range of 200 to 350 mesh was immersed in 400 ml of pure water, and a solution obtained by dissolving 3.35 g of palladium chloride in 65 ml of 0.5 N hydrochloric acid was added dropwise thereto with stirring. After the completion of the dropping, the solution was heated up to 80° C., and then continuously stirred for 30 minutes. The resulting catalyst was collected by filtration, washed with water. Afterward, 5 ml of a 37 wt % formaldehyde solution was added, and the temperature of the suspension was raised up to 60° C., followed by continuous stirring for 30 minutes. During this operation, a 4 wt % sodium hydroxide solution was added so as to become pH 9. Next, the suspension was filtered, and the resulting catalyst was washed with 1500 ml of pure water, and then dried at 120° C. for 12 hours. The prepared catalyst was evaluated in the same manner as in Example 9. An initial hydrogen partial pressure was 0.7 kgf/cm$^2$, and when operation was carried out for 200 hours, the hydrogen partial pressure was 1.0 kg/cm$^2$. The results of production ratios of by-products are shown in Table 4.

TABLE 4

|  | Alkali Metal | Production Ratio of By-product[1] | | |
| --- | --- | --- | --- | --- |
|  | (wt %)[2] | OX[3] | TH[4] | Others[5] |
| Example 9 | Na: 0.56 | 1/1300 | 1/3000 | — |
| Example 10 | Na: 0.41 | 1/1400 | 1/3000 | — |
| Example 11 | Na: 0.67 | 1/1000 | 1/2500 | — |
| Example 12 | Na: 0.13 | 1/1050 | 1/2000 | — |
| Example 13 | K: 0.43 | 1/1200 | 1/3000 | — |
| Example 14 | K: 0.52 | 1/1200 | 1/3500 | — |
| Comp. Ex. 9 | Na: 0.07 | 1/900 | 1/850 | — |
| Comp. Ex. 10 | Na: 0.01 | 1/850 | 1/600 | — |
| Comp. Ex. 11 | Na: 0.26 | 1/300 | 1/800 | 1/3000 |

Notes: [1]Production Ratio of the by-products to the main products
[2]wt % of the alkali metal to the carrier
[3]Amyloxanthrone
[4]Amyltetrahydroanthraquinone
[5]By-products other than amyloxanthrone and amyltetrahydroanthraquinone, and "—" shows a production less than an analytical error of liquid chromatography

EXAMPLE 15

A silica CARIACT Q-10 made by Fuji Silysia Chemical Ltd. was screened by a sieve so as to be in the range of 200 to 350 mesh. Afterward, 200 g of this silica was suspended in 680 ml of 25 wt % aqueous ammonia at room temperature. While the resulting suspension was stirred, a solution obtained by dissolving 6.7 g of palladium chloride in 120 ml of 25 wt % aqueous ammonia was added dropwise to the suspension. Next, this suspension was filtered, and the resulting catalyst was washed with 2000 ml of pure water, and then dried at 120° C. for 12 hours. The catalyst was subjected to a heat treatment at 200° C. for 1 hour under the circulation of nitrogen and further at 7500C for 3 hours under the circulation of air. The prepared catalyst was evaluated in the following manner. The results are shown in Table 5.

[Evaluation of catalyst]

The peeling and activity of palladium in the palladium catalyst supported on silica were evaluated by the use of a circulating hydrogenation reactor. This circulating hydrogenation reactor has a vacant volume of 2 liters, a candle filter therein and baffles on its inner wall.

10 g of the catalyst to be tested was placed in the above-mentioned circulating hydrogenation reactor, and anthraquinones were hydrogenated. The volume of the resulting working solution in the circulating hydrogenation reactor was maintained at 1 liter, and hydrogen was fed at 238 ml/min for 30 minutes. A pressure (PO) in the reactor after 30 minutes was recorded. Afterward, the working solution was introduced into the reactor at 33.3 ml/min. In order to constantly maintain the volume of the solution in the reactor, the working solution in which the anthraquinones were hydrogenated was separated from the catalyst through the candle filter, and then drawn from the hydrogenation reactor. Stirring was done by inclined turbine blades, and sufficient mixing could be accomplished by baffles provided on the wall surface of the reactor. A reaction temperature for the hydrogenation reaction was set to 40° C. After the working solution had been circulated for 1 hour, the catalyst in the reactor was collected, washed with methanol and water, and then dried at 120° C. After the test, the amount of supported palladium was determined.

The amounts of supported palladium before and after the test were determined by fluorescent X-ray.

As the working solution, there was used a solution obtained by dissolving amylanthraquinone in a mixed solvent of 60 vol % of 1,2,4-trimethylbenzene and 40 vol % of diisobutylcarbinol so that the concentration of amylanthraquinone might be 0.60 mol/l.

The catalytic activity was calculated in accordance with the following equation.

Catalytic activity=overall reaction rate/(catalyst amount× $P_0 \times$ Pd support ratio) wherein the overall reaction rate is a hydrogen feed rate (mol/hr), and the Pd support ratio is a weight ratio (-) of palladium based on the carrier.

Furthermore, a peel ratio (%) of palladium was calculated in accordance with the following equation.

$$\text{Pd peel ratio } (\%) = \frac{A - B}{A} \times 100$$

wherein A is the Pd support ratio before the test, and B is the Pd support ratio after the test.

EXAMPLE 16

The supporting and drying of palladium were conducted by the same procedure as in Example 15, and a heat treatment was then carried out at 700° C. for 3 hours under the circulation of air.

The thus prepared catalyst was evaluated in the same manner as in Example 15. The results are shown in Table 5.

EXAMPLE 17

The supporting and drying of palladium were conducted by the same procedure as in Example 15, and a heat treatment was then carried out at 650° C. for 3 hours under the circulation of air.

The thus prepared catalyst was evaluated in the same manner as in Example 15. The results are shown in Table 5.

EXAMPLE 18

The supporting and drying of palladium were conducted by the same procedure as in Example 15, and a heat treatment was then carried out at 600° C. for 3 hours under the circulation of air.

The thus prepared catalyst was evaluated in the same manner as in Example 15. The results are shown in Table 5.

EXAMPLE 19

The supporting and drying of palladium were conducted by the same procedure as in Example 15, and a heat treatment was then carried out at 550° C. for 3 hours under the circulation of air.

The thus prepared catalyst was evaluated in the same manner as in Example 15. The results are shown in Table 5.

EXAMPLE 20

A silica CARIACT Q-10 made by Fuji Silysia Chemical Ltd. was screened by a sieve so as to be in the range of 200 to 350 mesh. Afterward, 200 g of this silica was suspended in 500 ml of chloroform at room temperature. While this suspension was stirred, a solution obtained by dissolving 8.4 g of palladium acetate in 200 ml of chloroform was added dropwise to the suspension. Next, chloroform was distilled off under reduced pressure by a rotary evaporator, followed by drying at 120° C. for 12 hours. Furthermore, a heat treatment was carried out at 600° C. for 3 hours under the circulation of air.

The thus prepared catalyst was evaluated in the same manner as in Example 15. The results are shown in Table 5.

EXAMPLE 21

A silica CARIACT Q-10 made by Fuji Silysia Chemical Ltd. was screened by a sieve so as to be in the range of 200 to 350 mesh. Afterward, 200 g of this silica was suspended in 500 ml of dichloromethane at room temperature. While this suspension was stirred, a solution obtained by dissolving 4.2 g of palladium acetate in 400 ml of dichloromethane was added dropwise to the suspension. Next, dichloromethane was distilled off under reduced pressure by a rotary evaporator, followed by drying at 120° C. for 12 hours. Furthermore, a heat treatment was carried out at 600*C for 3 hours under the circulation of air.

The thus prepared catalyst was evaluated in the same manner as in Example 15. The results are shown in Table 5.

COMPARATIVE EXAMPLE 12

For the preparation of a control, the supporting and drying of palladium were conducted by the same procedure as in Example 15, and a heat treatment was then carried out at 450° C. for 3 hours under the circulation of air.

The thus prepared catalyst was evaluated in the same manner as in Example 15. The results are shown in Table 5.

COMPARATIVE EXAMPLE 13

The supporting and drying of palladium were conducted by the same procedure as in Example 15, and a heat treatment was then carried out at 350° C. for 3 hours under the circulation of air.

The thus prepared catalyst was evaluated in the same manner as in Example 15. The results are shown in Table 5.

COMPARATIVE EXAMPLE 14

The supporting and drying of palladium were conducted by the same procedure as in Example 15, and a heat treatment was then carried out at 250° C. for 3 hours under the circulation of air.

The thus prepared catalyst was evaluated in the same manner as in Example 15. The results are shown in Table 5.

COMPARATIVE EXAMPLE 15

The supporting and drying of palladium were conducted by the same procedure as in Example 15, and a heat treatment was then carried out at 850° C. for 3 hours under the circulation of air.

The thus prepared catalyst was evaluated in the same manner as in Example 15. The results are shown in Table 5.

COMPARATIVE EXAMPLE 16

The supporting and drying of palladium were conducted by the same procedure as in Example 20, and a heat treatment was then carried out at 350° C. for 3 hours under the circulation of air.

The thus prepared catalyst was evaluated in the same manner as in Example 15. The results are shown in Table 5.

COMPARATIVE EXAMPLE 17

The supporting and drying of palladium were conducted by the same procedure as in Example 20, and a heat treatment was then carried out at 850° C. for 3 hours under the circulation of air.

The thus prepared catalyst was evaluated in the same manner as in Example 15. The results are shown in Table 5.

TABLE 5

| | Heat Treatment Temp. (°C.) | Ratio of supported Pd[1] Before Test | Ratio of supported Pd[1] After Test | Pd Peel Ratio (%) | Catalytic Activity[2] |
|---|---|---|---|---|---|
| Example 15 | 750 | 1.86 | 1.86 | 0 | 12.4 |
| Example 16 | 700 | 1.87 | 1.86 | 1 | 13.4 |
| Example 17 | 650 | 1.90 | 1.90 | 0 | 14.2 |
| Example 18 | 600 | 1.84 | 1.84 | 0 | 16.3 |
| Example 19 | 550 | 1.83 | 1.50 | 10 | 18.6 |
| Example 20 | 600 | 1.92 | 1.86 | 3 | 12.0 |
| Example 21 | 600 | 0.95 | 0.90 | 5 | 14.7 |
| Comp. Ex. 12 | 450 | 1.88 | 1.03 | 45 | 23.4 |
| Comp. Ex. 13 | 350 | 1.85 | 0.94 | 49 | 23.8 |
| Comp. Ex. 14 | 250 | 1.85 | 1.05 | 43 | 8.6 |
| Comp. Ex. 15 | 850 | 1.86 | 1.86 | 0 | 9.7 |
| Comp. Ex. 16 | 350 | 1.89 | 1.01 | 47 | 22.2 |
| Comp. Ex. 17 | 850 | 1.90 | 1.88 | 1 | 7.9 |

Notes: [1] wt % of palladium to the carrier
[2] (mol·cm$^2$)/(h·g#kgf.Pd support ratio)

What is claimed is:

1. A method for preparing hydrogen peroxide in accordance with an anthraquinone method comprising hydrogenating at least one anthraquinone with a hydrogenation catalyst comprising palladium supported on a carrier comprising spherical silica particles at least 90 wt % of said spherical silica particles having Particle diameters of 10 to 100 μm, said spherical silica particles having an average particle diameter of 30 to 60 μm and said spherical silica particles having a pore volume of 0.5 to 1.0 ml/g.

2. The method according to claim 1 wherein at least 90 wt % of said spherical particles have particle diameters of 20 to 70 μm, and said spherical silica particles have an average particle diameter of 40 to 60 μm.

3. The method according to claim 1 wherein at least 90 wt % of said spherical silica particles have particle diameters of 20 to 70 μm, said spherical silica particles having an average particle diameter of 40 to 60 μm, and said spherical silica particles having a pore volume of 0.5 to 0.8 ml/g.

4. The method according to claim 1 wherein the amount of palladium supported is 0.1 to 10 wt % based on the weight of the carrier comprising the spherical silica particles.

5. The method according to claim 1 wherein 91 wt % of said spherical silica particles have particle diameters of 10 to 100 μm, said spherical silica particles having an average particle diameter of 45 μm and said spherical silica particles having a pore volume of 0.74 ml/g.

6. The method according to claim 1 wherein 91 wt % of said spherical silica particles have particle diameters of 20 to 70 μm, said spherical silica particles having an average particle diameter of 45 μm and said spherical silica particles having a pore volume of 0.74 ml/g.

7. The method according to claim 1 wherein 93 wt % of said spherical silica particles have particle diameters of 10 to 100 μm, said spherical silica particles have an average particle diameter of 54 μm and said spherical silica particles have a pore volume of 0.78 ml/g.

* * * * *